United States Patent [19]

Gilbert

[11] Patent Number: 5,472,215
[45] Date of Patent: Dec. 5, 1995

[54] ROTATING HIGH VACUUM MERCURY SEAL

[75] Inventor: Paul A. Gilbert, Vicksburg, Miss.

[73] Assignee: The United States of America as represented by the Secretary of the Army, Washington, D.C.

[21] Appl. No.: 215,744

[22] Filed: Mar. 21, 1994

[51] Int. Cl.⁶ .................................................. F16J 15/14
[52] U.S. Cl. ............................ 277/135; 277/22; 285/11
[58] Field of Search ........................ 277/135, 22, 53, 277/56, 12; 285/10, 11

[56] References Cited

U.S. PATENT DOCUMENTS

| | | |
|---|---|---|
| 725,937 | 4/1903 | Graig .................................. 277/135 |
| 1,213,494 | 1/1917 | Ittner . |
| 1,346,926 | 7/1920 | Wilfley . |
| 1,931,706 | 10/1933 | Powell . |
| 2,064,703 | 12/1936 | Van De Graaff . |
| 2,488,200 | 11/1949 | Juhlin et al. . |
| 2,544,423 | 3/1951 | Goddard . |
| 2,678,835 | 5/1954 | Clark, Jr. . |
| 3,038,731 | 6/1962 | Milleron ............................. 277/135 |
| 3,166,133 | 1/1965 | Hall et al. . |
| 3,910,041 | 10/1975 | Gibson ................................ 277/135 |
| 4,235,446 | 11/1980 | Verhey . |
| 4,260,167 | 4/1981 | Fox ...................................... 277/135 |
| 4,563,012 | 1/1986 | Zimmermann et al. . |
| 4,575,102 | 3/1986 | Raj et al. . |

FOREIGN PATENT DOCUMENTS 1233487  5/1971  United Kingdom ................ 277/135

Primary Examiner—Daniel G. DePumpo
Attorney, Agent, or Firm—Luther A. Marsh

[57] ABSTRACT

A seal for communicating high vacuum onto rotating machinery such as a centrifuge. The seal comprises an outer pipe defining a volume to be evacuated, an inner pipe connected on one end to a vacuum source with the other end disposed within an end of the outer pipe such that an annular space is defined between the inner pipe and the outer pipe. Fluid is disposed in at least a portion of the annular space. The fluid is also disposed in a reservoir provided with cooling coils which lower the temperature of the fluid and thereby lower the vapor pressure of the fluid. The lower the vapor pressure of the fluid, the higher the level of vacuum which can be produced and transmitted.

7 Claims, 2 Drawing Sheets

1

ROTATING HIGH VACUUM MERCURY SEAL

BACKGROUND OF THE INVENTION

1. Field of the Invention

This invention relates to seals and, more particularly, a sealing mechanism for communicating high vacuum onto rotating machinery having virtually unlimited rotation.

2. Background

High vacuum is defined as having a pressure of less than 0.001 millimeters (mm) of mercury. When using rotating machinery, such as a centrifuge, there is occasionally a need to transmit high vacuum onto the rotating/moving components. For example, there are engineering applications where it is critical to deliver and maintain high vacuum to a component rotating at a relatively high speed for extended periods of time. One such application involves a centrifuge which accelerates small-scale models to simulate and study civil engineering problems. In these simulations, rotation of a model or component may be required at speeds of four (4) revolutions per second for periods ranging from several hours to several days. At the same time, it may be necessary to maintain vacuum levels ranging from 0.001 to 0.00000145 mm of mercury while the rotating component experiences essentially unlimited angular displacement. Presently, no technology exists to satisfactorily provide for such requirements.

Currently, there are various rotating seals used to transmit high vacuum onto rotating/moving components. For example, rotating seals may be constructed of metal surfaces which are mated by swaging. Alternatively, rotating seals may be constructed of soft lubricated polymeric surfaces (such as rubber or plastic) which are held in forced contact by pressure. With either type of rotating seal, excessive friction has been a problem. Frictional forces cause rapid wear of the seal which compromises its integrity and results in vacuum leakage. Further, frictional forces may generate undesirable heat. Accordingly, in the case of either swaged metal seals or lubricated polymeric seals, only a limited amount of rotation is possible before the sealing surfaces are worn and damaged.

Rotary slip-rings are sometimes used as an alternative to rotating seals; however, slip-rings are not designed to transmit vacuum. Instead, slip-rings transmit positive pressures where leakage is much less critical. In fact, slip-rings are not leak-tight and therefore will not allow high levels of vacuum to be maintained.

Accordingly, there is no presently available seal technology which provides a sufficient seal for the transmission of high vacuum onto rotating machinery wherein, the seal has the ability to accommodate unlimited rotation. There is a further need for a seal which is constructed of materials that do not fatigue or wear and which offers minimal frictional resistance to rotary motion while simultaneously generating negligible heat during operation.

SUMMARY OF THE INVENTION

The present invention is a seal which allows the transmission of high vacuum from a vacuum pump to rotating machinery while offering minimal frictional resistance. The seal comprises an outer pipe, an inner pipe, and a fluid. The outer pipe has a first end disposed in rotating machinery and a second end disposed in alignment with the axis of rotation of the rotating machinery. The inner pipe has a first end disposed within the interior of the outer pipe and a second end connected to a device such as a vacuum pump for applying suction. The outer diameter of the inner pipe is smaller than the inner diameter of the outer pipe. This allows a portion of the inner pipe to extend into a portion of the outer pipe. Because the outer pipe and the inner pipe do not touch an annular space is maintained in which a fluid such as mercury is disposed.

Mercury occupies the annular space between the inner pipe and outer pipe and is also disposed in a reservoir. The reservoir of mercury and the mercury within the annular space provide a seal which prevents fluid such as air from passing into tile region of the outer pipe located above the height of the mercury. The height of the mercury in the annular space is determined in part by the initial level of the mercury in the reservoir. The outer pipe rotates about the axis common to both pipes while the inner pipe remains stationary. A vacuum pump connected to the inner pipe transmits vacuum through the seal to the outer pipe, a portion of which is disposed within rotating machinery. As the high vacuum is applied, the height of the mercury in the annular space rises. Cooling coils are incorporated into the walls of the reservoir to decrease the vapor pressure of mercury and therefore increase the strength of the vacuum.

The above and other objects and advantages of this invention will be readily apparent from a reading of the following description of an exemplary embodiment thereof taken in conjunction with the following drawings.

BRIEF DESCRIPTION OF THE DRAWINGS

The accompanying drawings which are incorporated in and form a part of the specification, illustrate an embodiment of the present invention and, together with the description, serve to explain the principles of the invention.

In the drawings.

DESCRIPTION OF THE PREFERRED EMBODIMENT

Referring to the accompanying drawings, wherein like numbers indicate like elements, a rotating high vacuum mercury seal is shown generally at 2. Seal 2 comprises an outer pipe 4, inner pipe 6, and mercury shown generally at 12. Each of these elements will now be described in greater detail.

Figure 1:
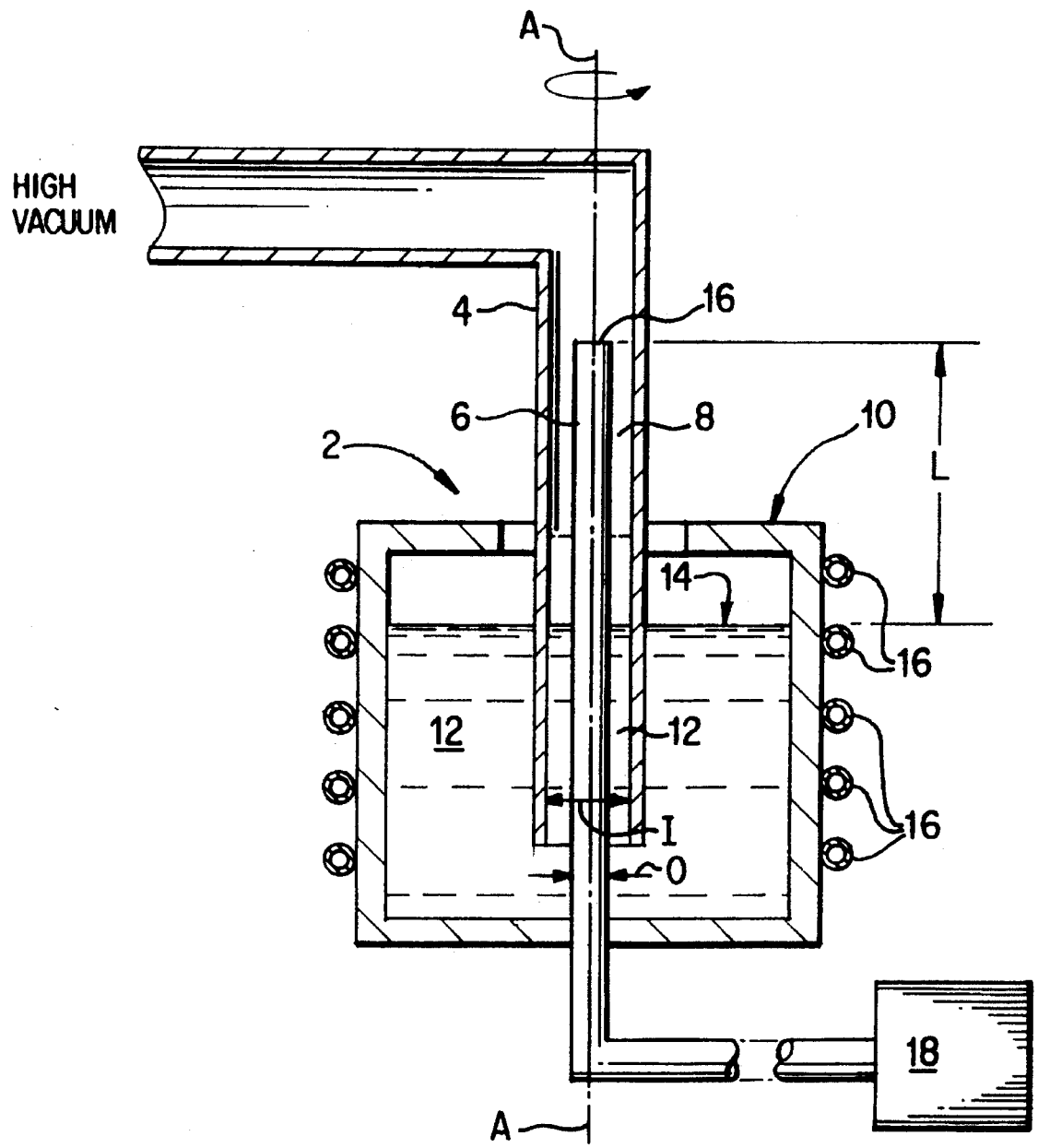
FIG. 1 is a cutaway plan view of a rotating high vacuum mercury seal according to the present invention.
Figure 2:
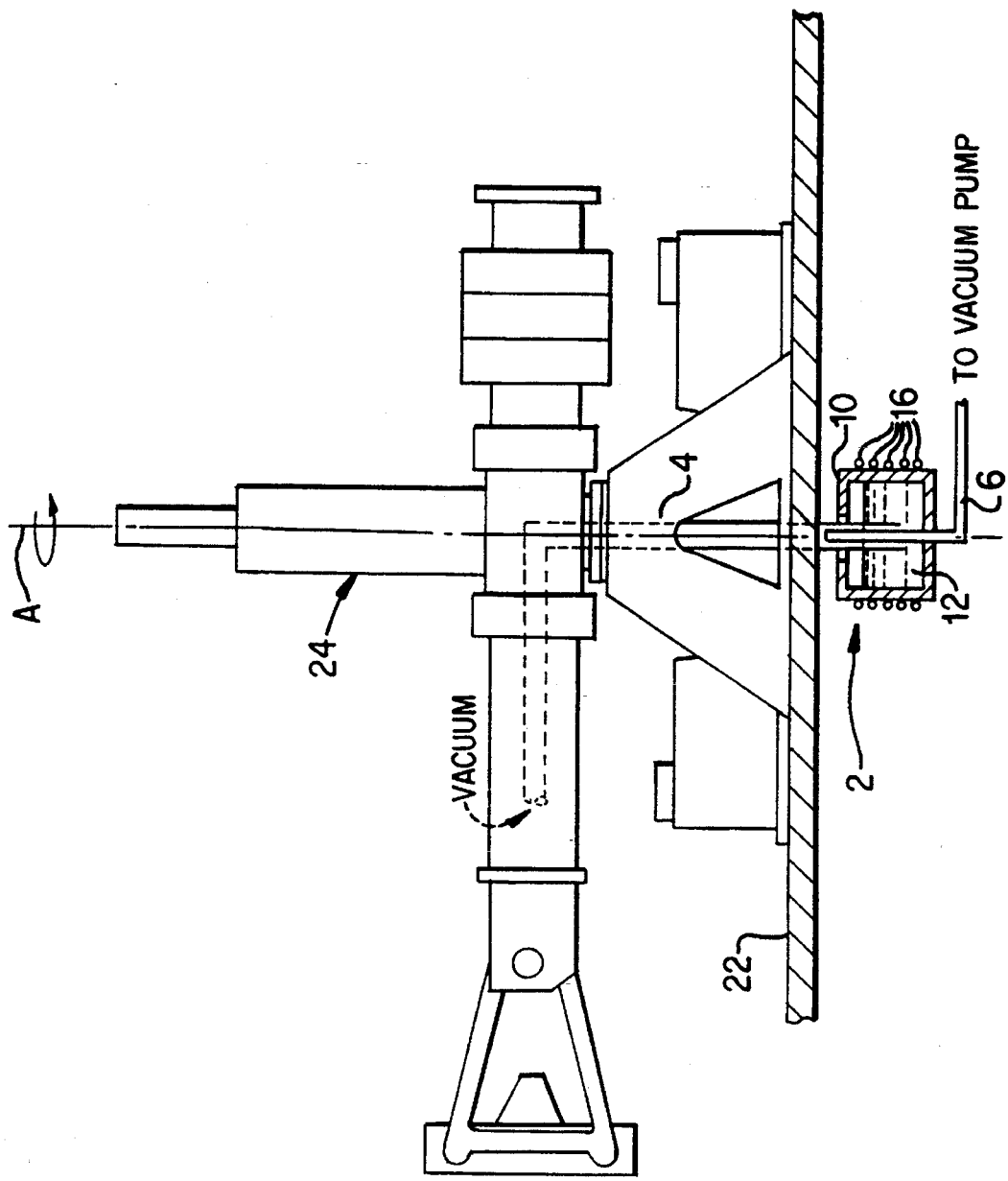
FIG. 2 is a partial cutaway plan view of the rotating high vacuum mercury seal communicating with rotating machinery.

The outer pipe 4 has an inside diameter shown generally at I and has an axis which is aligned with the axis of rotation A of rotating machinery 24 (shown in FIG. 2) which is mounted on surface 22. Outer pipe 4 rotates about axis A.

Inner pipe 6 also has a first end which is aligned with the axis of rotating machinery 24 and outer pipe 4. Inner pipe 6, rotating machinery 24 and outer pipe 4 share the same axis of rotation. However, inner pipe 6 remains stationary. Inner pipe 6 has an outside diameter shown generally at O and a top end shown at 16. As illustrated, the outside diameter O of inner pipe 6 is smaller than the inside diameter I of outer pipe 4. Accordingly, a portion of inner pipe 6 extends into a portion of outer pipe 4, thereby creating an annular space 8 between inner and outer pipes 4 and 6. Outside diameter 0 is concentrically aligned with the inside diameter of outer pipe 4 into which the outside diameter I of inner pipe 4 extends. Inner pipe 6 has a second end which communicates with a vacuum source or pump 18.

The axis of inner pipe 6 may assume any shape or orientation as long as it delivers a vacuum to the space above the level of mercury 12. Further, inner pipe 6 need not remain stationary. Instead, it is only a requirement that outer pipe 4 rotate relative to inner pipe 6 and that there be an annular space 8 between outer pipe 4 and inner pipe 6.

Reservoir 10 is filled with an appropriate volume of mercury 12 which fills reservoir 10 up to initial level 14. Inner pipe 6 extends through the bottom of reservoir 10 so that mercury 12 occupies a portion of annular space 8 between the outer pipe 4 and inner pipe 6, but below the first end of inner pipe 6. The pipes, 4 and 6, which come into contact with mercury 12 as well as reservoir 10 should be made of material which does not combine or react with mercury 12 and which is durable.

In operation, rotating machinery 24 is activated. As rotating machinery 24 rotates, outer pipe 4 rotates about the axis A. Next, a vacuum is applied by vacuum pump 18. The vacuum is transmitted through the rotating high vacuum mercury seal 2 and to rotating machinery 24. As a result, the desired volume on rotating machinery 24 is evacuated and mercury 12 rises in annular space 8 between outer pipe 4 and inner pipe 6. The maximum height a column of mercury 12 can be lifted by a vacuum is approximately 760 mm. Therefore, the distance L between initial level 14 of mercury 12 and the top end 16 of inner pipe 6 must be greater than 760 mm so that mercury 12 is never pulled or sucked into inner pipe 6 if a high vacuum seal is desired. Alternatively, it is acknowledged that a distance L of less than 760 mm could be used if a low vacuum seal is required.

As outer pipe 6 rotates, negligible friction exists between outer pipe 6 and mercury 12. Because negligible friction is created, negligible heat is created. A further benefit is that fatigue or wear in outer pipe 6 is avoided in seal 2 because outer pipe 6 is in contact only with mercury 12. Because inner pipe 4 also is in contact only with mercury 12 in seal 2, benefits similar to those ascribed above to outer pipe 6 are realized.

Cooling means are incorporated into the walls of reservoir 10. Specifically, cooling coils 16 are connected to an external refrigeration system (not shown) to allow mercury 12 to be cooled. Cooling mercury 12 accomplishes two purposes. First, it permits a higher vacuum to be applied because the vapor pressure of mercury 12 is lowered by lowering its temperature. Second, cooling the mercury 12 minimizes vaporization. Therefore, cooling mercury 12 to any temperature above its solidification temperature is acceptable and desirable.

For example, at −38° Centigrade (C), the vapor pressure of mercury is 0.00000145 mm of mercury. Therefore, a vacuum pump 18 of appropriate quality which lifts a column of mercury at −380° C. can produce a vacuum of 0.00000145 mm of mercury 12. In contrast, at 180° C. mercury 12 has a vapor pressure of 0.001 mm of mercury. At 18° C., 0.001 mm of mercury 12 is the highest level of vacuum possible.

The temperature of mercury 12 in reservoir 10 can be monitored with sensors (not shown) which interface with and control the refrigeration system to insure that the temperature of mercury 12 is not allowed to go below, for example, −38° C. because mercury solidifies or freezes at −38.87° C. When mercury 12 is chilled to −38° C., a vacuum pump 18 of suitable quality would be capable of producing a vacuum of 0.00000145 mm of mercury 12 in a properly sealed chamber located on rotating machinery 24 experiencing unlimited angular displacement.

While the foregoing description of the preferred embodiment of the invention is specifically directed toward a rotating high vacuum mercury seal, it is anticipated that the invention could be adapted for use in ways other than those specifically mentioned. Accordingly, the foregoing description is not intended to be exhaustive or to limit the invention to the precise form disclosed, and obviously many possible modifications and variations are possible in light of the above teaching. For example, it is contemplated that fluids other than mercury 12 may be substituted in reservoir 10. The lower the vapor pressure of the fluid at a particular temperature, the higher the level of vacuum which can be produced. If a fluid other than mercury 12 is utilized, the distance L between the top surface 14 of the fluid and the top of the inner pipe 16 must be adjusted to accommodate the maximum height a column of the fluid can be lifted by vacuum. Solidification temperature of a fluid other than mercury must also be properly taken into account.

The embodiments were chosen and described in order to best explain the principles of the present invention and its practical application to thereby enable others skilled in the an to best utilize the modifications as are suited to the particular use contemplated. It is intended that the scope of the invention be defined by the claims appended hereto.

What is claimed is:

1. A seal comprising:

an outer pipe defining a volume to be evacuated;

an inner pipe in communication with a vacuum:

An annular space is defined between said inner pipe and said outer pipe to allow rotation of said outer pipe relative to said inner pipe; and, a fluid, disposed in at least a portion of said annular space below the first and of said inner pipe.

2. A seal according to claim 1, wherein the fluid is mercury.

3. A seal according to claim 2, wherein the mercury is disposed in a reservoir.

4. A seal according to claim 3, further comprising cooling means communicating with said reservoir for cooling said mercury.

5. A seal according to claim 4, wherein said outer pipe extends into rotating machinery.

6. A seal according to claim 5, wherein said inner pipe extends more than 760 mm above the level of said mercury in said reservoir at atmospheric pressure.

7. A seal according to claim 5, wherein said inner pipe extends less than 760 mm above the level of said mercury in said reservoir at atmospheric pressure.

\* \* \* \* \*